(12) United States Patent
Solheim et al.

(10) Patent No.: US 7,518,951 B2
(45) Date of Patent: Apr. 14, 2009

(54) SYSTEMS AND METHODS FOR SEISMIC STREAMER POSITIONING

(75) Inventors: Stig Solheim, Oesteraas (NO); Kenneth E. Welker, Nesoya (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/086,030

(22) Filed: Mar. 22, 2005

(65) Prior Publication Data

US 2006/0215489 A1    Sep. 28, 2006

(51) Int. Cl.
GO1S 3/80    (2006.01)
(52) U.S. Cl. .......................... 367/130; 367/106; 367/19
(58) Field of Classification Search .................. 367/20, 367/129, 130, 15, 24
See application file for complete search history.

(56) References Cited

U.S. PATENT DOCUMENTS

| | | | |
|---|---|---|---|
| 4,187,492 A | 2/1980 | Delignieres | |
| 4,404,664 A | 9/1983 | Zachariadis | |
| 4,446,538 A | 5/1984 | Zachariadis | |
| 4,912,682 A | 3/1990 | Norton et al. | |
| 4,937,793 A * | 6/1990 | Shuck et al. | 367/20 |
| 5,148,406 A * | 9/1992 | Brink et al. | 367/20 |
| 5,359,575 A * | 10/1994 | Williams et al. | 367/127 |
| 5,668,775 A | 9/1997 | Hatteland | |
| 5,696,733 A | 12/1997 | Zinn et al. | |
| 5,757,722 A | 5/1998 | Zinn | |
| 6,229,760 B1 | 5/2001 | Ambs | |
| 6,493,636 B1 * | 12/2002 | DeKok | 367/20 |
| 6,839,302 B2 * | 1/2005 | Austad et al. | 367/19 |
| 2003/0208320 A1 | 11/2003 | Zajac | |
| 2004/0004907 A1 | 1/2004 | Austad et al. | |
| 2004/0060498 A1 | 4/2004 | Peterson et al. | |

FOREIGN PATENT DOCUMENTS

| | | | |
|---|---|---|---|
| GB | 2128328 A | | 4/1984 |
| WO | WO 84/03153 | * | 8/1984 |
| WO | WO 2004036253 A1 | | 4/2004 |
| WO | WO 2004036254 A1 | | 4/2004 |
| WO | WO 2004053527 A1 | | 6/2004 |
| WO | WO 2004092771 A2 | | 10/2004 |
| WO | WO 2005073758 A1 | | 8/2005 |
| WO | WO 2005096018 A1 | | 10/2005 |

* cited by examiner

*Primary Examiner*—Ian J Lobo
(74) *Attorney, Agent, or Firm*—Fred Pruner; Liangang (Mark) Ye; Jeffrey E Griffin

(57) ABSTRACT

Systems and methods for determining position of one or more seismic streamers are disclosed. One system embodiment includes a seismic streamer towed by a towing vessel at a first depth; at least one positioning streamer towed by the towing vessel at a second depth different than the first depth; and an acoustic ranging system between the seismic and positioning streamers It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims. 37 CFR 1.72(b).

6 Claims, 4 Drawing Sheets

SYSTEMS AND METHODS FOR SEISMIC STREAMER POSITIONING

BACKGROUND OF THE INVENTION

1. Field of Invention

The present invention relates to the field of marine seismic data acquisition systems and methods of using same. More specifically, the invention relates to systems and methods for positioning of seismic streamers.

2. Related Art

Marine seismic exploration investigates and maps the structure and character of subsurface geological formations underlying a body of water. For large survey areas, seismic vessels tow one or more seismic sources and multiple seismic streamer cables through the water. The seismic sources typically comprise compressed air guns for generating acoustic pulses in the water. The energy from these pulses propagates downwardly into the geological formations and is reflected upwardly from the interfaces between subsurface geological formations. The reflected energy is sensed with hydrophones attached to the seismic streamers, and data representing such energy is recorded and processed to provide information about the underlying geological features.

Streamers are typically positioned with acoustic ranging devices attached to or integrated into the streamers. The performance of the acoustic ranging devices varies throughout the spread for a variety of reasons. These hindrances to acoustic propagation include bubbles in the water column generated by the seismic source, density layering in the water column causing refraction and reflection of the acoustic energy, and interference from bottom reflected signals. In an attempt to deal with the degraded acoustic performance due to these factors, the individual distance measurements are often manually and interactively filtered before the distances are introduced to the position estimation algorithms. Further, the subjectivity of manual filtering can give position estimate biases, and is in any case labor intensive. In some cases the degraded acoustic performance is so severe that filtering is not possible and re-acquisition is required, (at great expense) and only possible when the acoustic propagation environment changes to allow it. When adequate relative positions are determined through acoustic ranging and other types of relative positioning measures such as compasses, baseline distances, and inertial positioning units, a link is needed to an earth fixed reference frame. This is typically achieved through the Global Positioning System (GPS) using receivers mounted on buoys or floats attached to the streamers and sources of the seismic spread. These floats are connected at points away from the seismic hydrophones to prevent tugging noise at the hydrophones. The longer the distance along the streamer away from the GPS control points, the greater the degradation of positioning accuracy throughout the spread. The current state of the art is to asymmetrically deploy tail buoys at the front and tail of the spread, with fewer floats at the front due to the towing and handling challenges encountered near the seismic source.

From the above it is evident that there is a need in the art for improvement in positioning of marine seismic streamers.

SUMMARY OF THE INVENTION

In accordance with the present invention, systems and methods are described for determining position of seismic streamers. The systems and methods of the invention reduce or overcome problems with previous systems and methods. Systems and methods of the invention may be used to collect marine seismic data, for example 3-D and 4-D marine seismic data.

A first aspect of the invention is a system comprising:
(a) a seismic streamer towed by a towing vessel at a first depth;
(b) at least one positioning streamer towed by the towing vessel at a second depth different than the first depth; and
(c) a acoustic ranging system comprising a transmitter and a receiver, one of the transmitter and receiver positioned in the seismic streamer and the other positioned in the positioning streamer.

The transmitters and receivers may be dual functioning units that both transmit and receive acoustic signals. A minor portion of the positioning streamer may be positioned at the same depth as the seismic streamers. For example, when the major portion of the positioning streamer is positioned below the seismic streamers, a minor portion will necessarily be at the same depth, and the tail portion will be above the seismic streamers. Two positioning streamers may be employed on opposite sides of the seismic streamer, for example one positioning streamer at the same depth as the seismic streamer and one at a different depth from the first positioning streamer. Another embodiment may have one positioning streamer above and one positioning streamer below the seismic streamer. Systems of the invention may also utilize buoy-mounted acoustic transmitters and/or receivers wherein the buoys are tethered to something other than the streamers, such as a buoy anchored in a channel.

Systems of the invention may include satellite-based global positioning control points (satellite receivers) spaced as desired throughout the spread, either regularly or randomly spaced. The satellite receivers may be stationed on floatation devices, for example buoys, tethered to the positioning streamer. The positioning streamer may be shorter than the seismic streamer, and one of the satellite receivers may be stationed at the tail of the positioning streamer. A combination of these latter two options allows a satellite receiver to be stationed near a quarter point between a midpoint and a tail of one or more seismic streamers. It is also within the invention to station a satellite receiver near a quarter point between the midpoint of the seismic streamer and the towing vessel. As with acoustic transmitters and receivers, the invention contemplates usage of buoy-mounted satellite receivers in conjunction with one or more positioning streamers, wherein some of the buoys are not attached to any spread element, but anchored to some other location.

Systems of the invention include those systems wherein the seismic streamer or streamers are adapted to be towed at a shallower depth than the positioning streamer or streamers, and vice versa. The seismic and positioning streamers may be positioned in over/under arrangement, or offset horizontally, such as when the positioning streamer is towed deeper than the seismic streamer, the positioning streamer maybe offset horizontally. It is not necessary that the positioning streamer follow any defined path or trajectory, as long as it is able to function to provide alternative acoustic energy paths between energy sources on the seismic streamers and receivers on the positioning streamer, and communicate positions of the seismic streamers to the vessel or other information repository or controller (such as bird controllers) requiring the information. The positioning streamer may be positioned laterally outside of the seismic streamers, for example, on opposite sides of the spread. The positioning streamer may be towed slanted upward or downward. The positioning streamer may have any number of shapes, including straight and any curved shape, as long as it does not become entangled with the seismic streamers. One system embodiment comprises one or more positioning streamers containing several global positioning units, for example a unit every 1000 meters, rather than just one near the front and one near the tail. This configuration is especially desired for surveys where the shape of the spread is very long and thin, having at least two seismic streamers (in which case the positioning streamer or streamers may be about the same length as the seismic streamers). In this embodiment, and others having more than one seismic streamer, the positioning streamer or streamers may be placed at the same depth as the seismic streamers.

Another aspect of the invention comprises methods of determining position of seismic streamers by acoustic ranging, one method comprising:

(a) towing a seismic streamer at a first depth using a towing vessel;

(b) towing at least one positioning streamer at a second depth different from the first depth;

(c) performing acoustic ranging between the seismic streamer and at least one positioning streamer; and (d) selecting the first and the second depths such that there is adequate acoustic energy for the acoustic ranging.

Methods of the invention may comprise wherein the seismic streamer is towed shallower than the positioning streamer, and vice versa. Methods of the invention may include sensing earth-based position of the seismic streamer and/or the positioning streamer through use of Satellite receivers spaced as desired in the spread, which may be regularly or randomly spaced. One method embodiment comprises sensing position of the seismic streamer or streamers using one or more positioning streamers containing several global positioning units, for example a unit every 1000 meters, rather than just one near the front and one near the tail. The methods of the invention may employ a positioning streamer shorter than the seismic streamer. In some embodiments, the inventive methods comprise stationing a Satellite receiver at the tail of the positioning streamer, these methods allowing the Satellite receiver to receive signals near a quarter point between a midpoint and a tail of one or more seismic streamers. Methods including stationing a Satellite receiver near a quarter point between the midpoint of the seismic streamer and the towing vessel and tethered to a positioning streamer are also within the invention, alone or combined with other inventive methods.

Systems and methods of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

Figure 1:
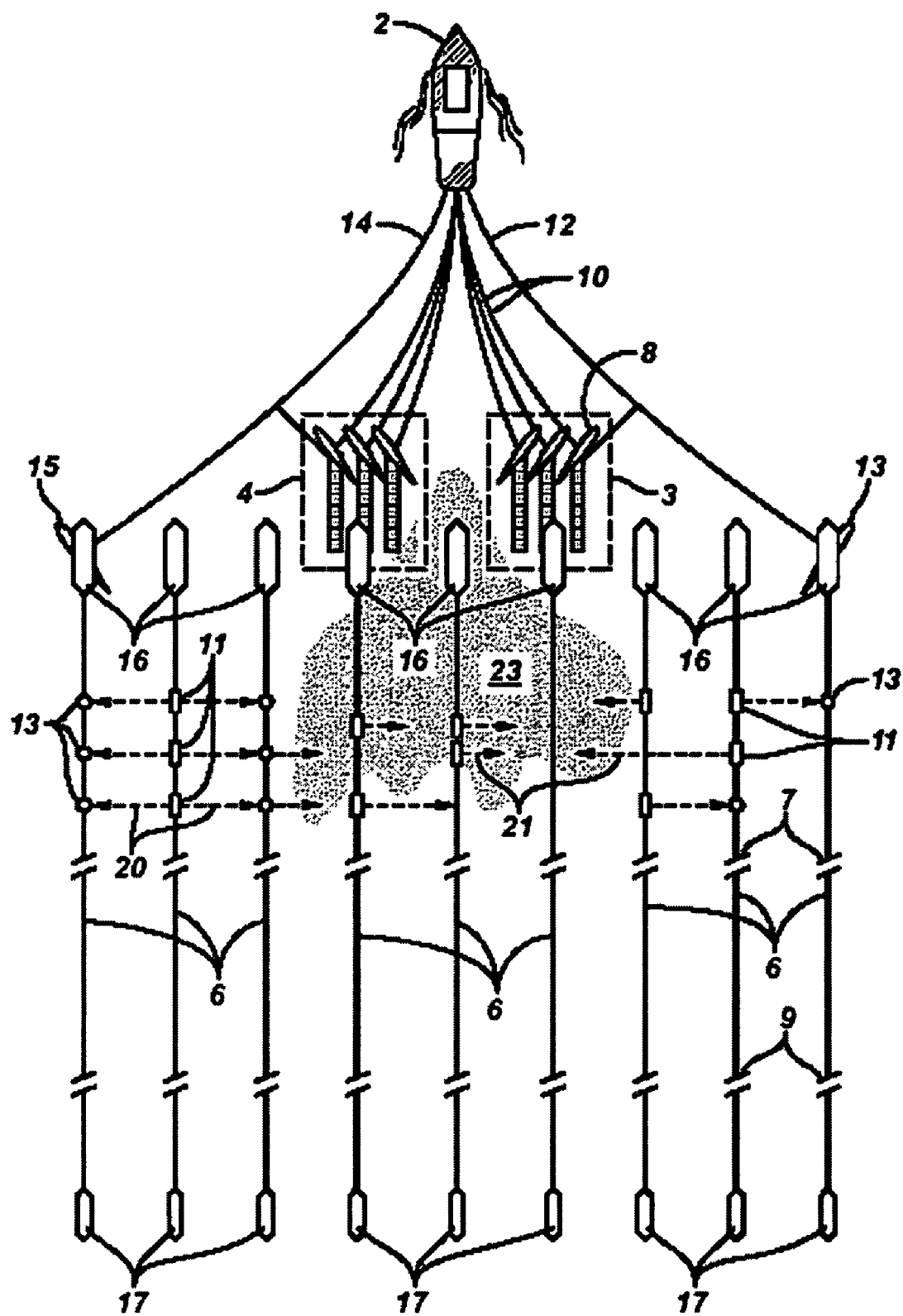
FIG. 1 illustrates a prior art towing arrangement showing a bubble field blocking acoustic signals between horizontally spaced streamers.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romantic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

In order to perform marine seismic surveys, one or more marine seismic streamers, each typically several thousand meters long and containing a large number of hydrophones and associated electronic equipment distributed along its length, is towed at about 5 knots behind a seismic survey vessel, which also may tow one or more seismic sources comprising source members, typically air guns. Acoustic signals produced by the source members are directed down through the water into the earth beneath, where they are reflected from the various strata. The reflected signals may be received by the hydrophones in the streamers, digitized and then transmitted to the seismic survey vessel, where they may be recorded and at least partially processed with the ultimate aim of building up a representation of the earth strata in the area being surveyed. In recent years, seismic streamers have included acoustic ranging systems, wherein acoustic transmitters and receivers (or transducers performing both functions of transmitting and/or receiving) are stationed strategically in the streamers and dedicated to determining position of the streamers. Note that acoustic transducers exist that are dual functioning units, both transmitting and receiving, and these may be used to determine distance between points on one or more seismic streamers and cables. One may speak of acoustic networks (or simply "nets") of transmitters and receivers placed, for example, at the mid-point of the streamers, thus forming a mid-point acoustic net, at the tail of the streamers forming a tail acoustic net, at the front of the streamers forming a front-end acoustic net, and/or quarter points of streamers, forming quarter point acoustic nets, and so on. Finally, if the acoustic positioning transmitters and receivers are placed generally throughout the streamers, one may speak of a so-called full-length acoustic net, which is in effect a single acoustic net. Satellite receivers stationed at the tow vessel and the end of the streamers on buoys help determine the earth-oriented position. However, due to bubble fields produced by the seismic sources, and/or any other acoustic propagation condition that hinders signal propagation, even full streamer length acoustic nets will not always function to determine position of the streamers accurately. Also, the further away from the Satellite receivers the acoustic positioning devices are in a particular net, the more any initial positioning uncertainty will grow.

The present invention relates to various systems and methods for determining position of one or more marine seismic streamers using one or more positioning streamers. Systems and methods of the invention may be used in marine seismology. Deployment of one or more positioning streamers with or without the seismic recording hydrophones active in the positioning streamer, and with acoustic ranging between the main acoustic network and the additional positioning streamers is contemplated. The present invention provides a different propagation path for the acoustic energy between the main spread and the positioning streamer(s). Additionally, in certain embodiments, regardless of the acoustic environment, a higher density of global positioning control points throughout the spread will improve overall accuracy by decreasing the distance between these points and the associated degradation of accuracy. These two steps can be combined, especially in the front of the spread by locating global positioning control points further back from the front of the streamers where bubbles from the source event typically obstruct acoustic ranges from the satellite-based control points typically placed near the front of the seismic streamers. Certain embodiments deploy positioning streamers shorter than the main seismic acquisition streamers so that the tail end of the positioning streamers, where the global positioning control points are located, are situated at or near the mid area of either the main full length acoustic network or any of the possible mid networks in a multi-network spread.

positioning streamers useful in the invention are similar in construction to seismic streamers. positioning streamers may comprise a large number of similar 100 meter streamer sections connected end-to-end, each section comprising a substantially cylindrical outer skin containing a pair of longitudinally extending strength members, typically ropes made of aramid fiber known under the trade designation KEVLAR™, to bear the towing forces. Acoustic transmitters and receivers are substantially uniformly distributed along the length of the positioning streamer section, and may be interspersed with cylindrical spacers and foam elements that are mounted on the strength members. The foam elements may be saturated in use with kerosene or a similar fluid to render the streamer section substantially neutrally buoyant. The streamer also may include electronics modules (or "bubbles") containing circuitry for digitizing the reflected signals detected by the receivers and for transmitting the digitized signals to the seismic survey vessels, these modules typically being connected between adjacent streamer sections.

Another positioning streamer construction comprises an elongate substantially solid core, at least one longitudinally extending strength member and a plurality of acoustic transmitters and receivers embedded in the core, a polymeric outer skin surrounding the core and defining there around an annular space, and polymeric foam material adapted to be substantially saturated with liquid and substantially filling the annular space. The acoustic transmitters and receivers may be encapsulated in capsules having at least one opening communicating with the annular space. The streamer may include a plurality of foam buoyancy elements, typically made from a skinned polymeric foam material such as skinned polypropylene foam, embedded in the core between the encapsulated hydrophones, and may further include a plurality of electronics modules each containing electronic circuitry for processing the signals produced by a plurality of the transmitter and receivers, the electronics modules being embedded in the core between them, along with electrical conductors for connecting the hydrophones to the electronics modules, electrical conductors for providing power to the electronics modules, electrical conductors for connecting the electronics modules to respective electro-optical conversion and multiplexing units connected in the streamer at intervals there along, and one or more optical fibers for interconnecting the electro-optical conversion and multiplexing units. The circuitry of each electronics module may be disposed within a cylindrical metal container, preferably of aluminum, which serves to shield the circuitry from external electrical interference. The digitized output signals may be converted into optical signals in the electronics bubbles, for multiplexing and high speed onward transmission via the optical fibers in the bundles to the vessel, where they are processed and recorded: thus it will be appreciated that the optical fibers serve to interconnect the electronics bubbles.

Although they may be towed at different depths in accordance with the invention, depending on the embodiment in question, both seismic and positioning streamers may be towed at depths ranging from about 3 to 20 meters below the surface of the water. This may be done by means of a "lead-in", a reinforced cable (for example an electro-optical cable) via which power and control signals are supplied to the streamer and seismic data signals are transmitted from the streamer back to the vessel. Vertical and/or horizontal position of the streamers may be controlled by orientation members, or steerable "birds" distributed along the length of the streamer. Typically, the front end of the streamer is mechanically coupled to the lead-in by at least one vibration-isolating section (or "stretch section"), while the rear end is coupled to a tail buoy incorporating a satellite-based position measuring system, typically via another "stretch section". As the positioning streamer(s) is/are a streamer not used to record seismic data, and which therefore may be placed anywhere where they are most useful, they may also be configured with multiple devices (like GPS takeouts) that would otherwise be unacceptable anywhere except the front/tail of the spread due to noise on the seismic receivers in the seismic streamers.

Referring now to the figures, FIG. 1 illustrates schematically and not to scale a prior art marine seismic spread, including a towing vessel 2 and two seismic sources 3 and 4. Towing vessel 2 tows nine seismic streamers 6, each streamer having a tow cable such as depicted at 12 and 14 (here only the tow cables for the outer most streamers 6 are shown for clarity). Other tow cables 10 tow sources 3 and 4. Sources 3 and 4 may be steered using remote controlled steering devices 8, and streamers 6 by deflectors 13 and 15. Each streamer 6, which may be kilometers long, typically will have a front buoy 16 and a tail buoy 17. Schematic breaks 7 in streamers 6 are not real breaks, but indicate long distance between front end buoys 16 and mid-points of the streamers, while schematic breaks 9 represent a long distance of streamers 6 from their mid-point to their tail end points near tail buoys 17. Air bubbles 23 in the water column caused by seismic sources 3 and 4 are depicted in FIG. 1 as small circles. Bubbles 23 may block the direct acoustic energy propagation path between some of the transmitters 11 and receivers 13 in horizontally spaced streamers 6. This denies the receivers in the bubble cloud some of the otherwise available acoustic ranges. Dotted arrows in FIG. 1 designated as 20 illustrate strong acoustic signals useful for positioning, while dotted arrows 21 illustrate attenuated acoustic signals that are less useful or not useful at all for acoustic positioning.

Figure 2A:
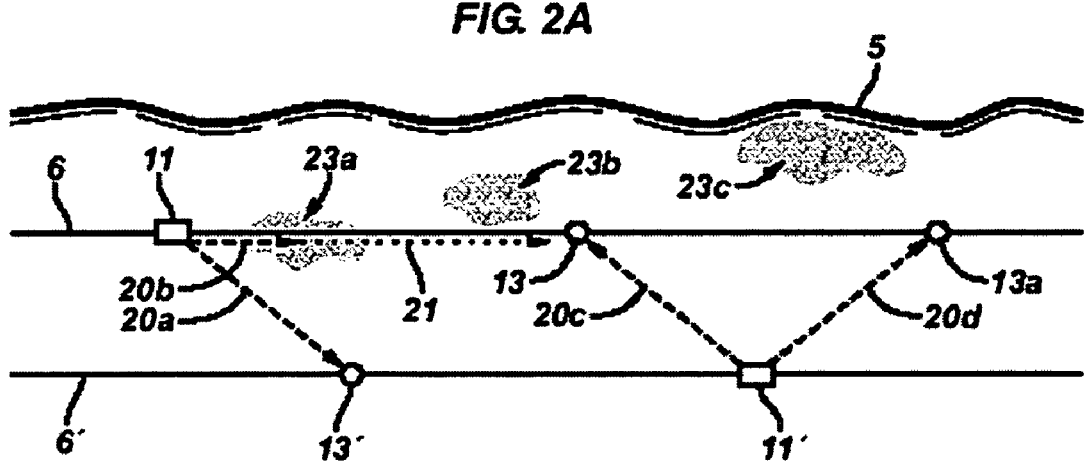
FIGS. 2A and 2B illustrate strong and attenuated acoustic ray paths in a streamer tow in accordance with the invention including vertically offset streamers.
Figure 2B:
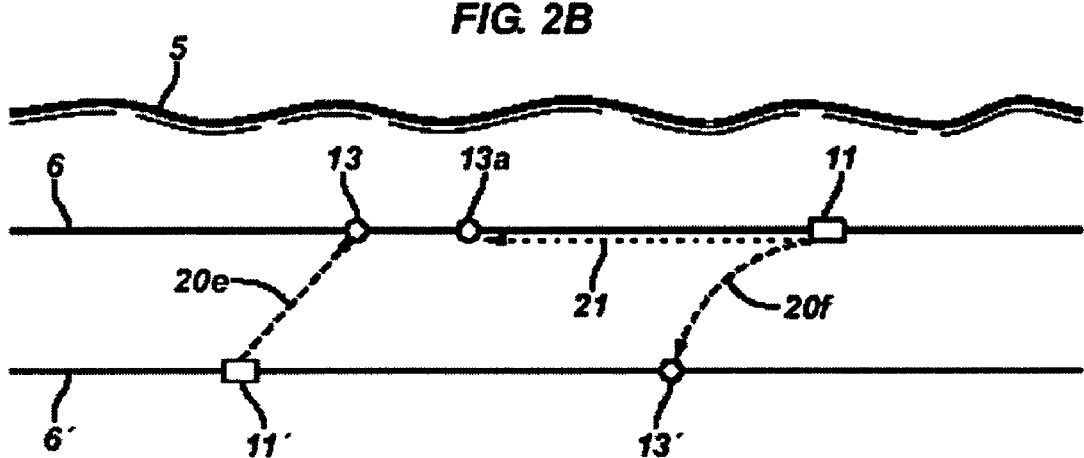

FIGS. 2A and 2B illustrate more clearly problems with prior art and solutions according to the present invention. Numerals designating the same features are used consistently throughout the figures. Heavy dashed lines 20 again illustrate strong acoustic signals, while dashed lines 21 indicate attenuated acoustic signals. FIG. 2A illustrates an attenuated signal 21 from an acoustic transmitter 11 caused by a bubble cloud 23. Without the use of a positioning streamer 6', including a transmitter 11', receiver 13 in seismic streamer 6 would not be helpful in acoustic positioning of seismic streamer 6 near transmitter 11. The problem is that the energy received at receiver 13 is so weak that a usable detection may be difficult or impossible, and the range measurement may be erroneous. The resulting measurement could be virtually anything, since receiver 13 is looking at noise that has drowned the signal partially or completely. So effectively, the range between transmitter 11 and receiver 13 is not measured, or is not usable in the position estimation algorithm, and is rejected. However, receiver 13' in positioning streamer 6 is able to detect a strong, normal signal 20a. Meanwhile, acoustic transmitter 11' emits signals 20c and 20d, which are unimpeded by bubbles. Signals 20c and 20d from transmitter 11' on positioning streamer 6' may be received by receivers 13 and 13a on seismic streamer 6, allowing position of streamer 6 near receivers 13 and 13a to be ascertained. FIG. 2B illustrates an attenuated signal 21 emanating from transmitter 11 on seismic streamer 6 reaching a receiver 13a, while a strong signal 20f is refracted away from horizontal by a refractive layer of water to a receiver 13' on positioning streamer 6'. The reverse may also occur, allowing ranging to a positioning streamer 6" (not shown) above seismic streamer 6. A strong signal is also depicted by heavy dashed line 20e from transmitter 11' to receiver 13.

Figure 3:
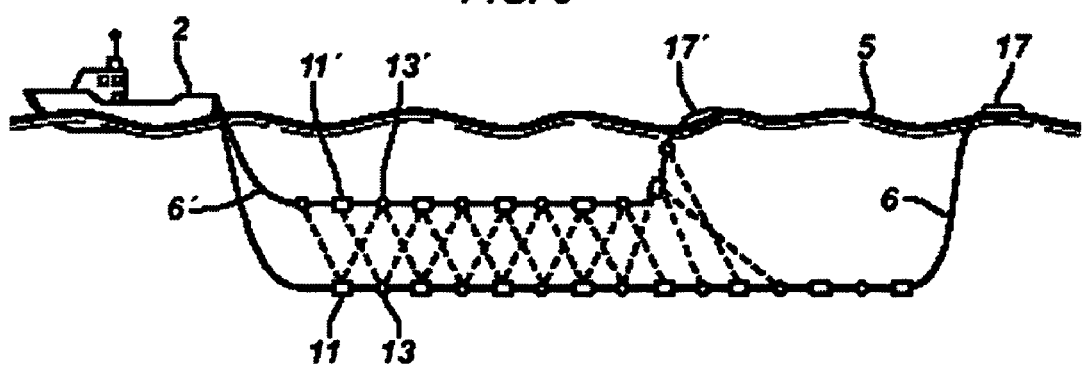
FIGS. 3 and 4 illustrate two embodiments of systems and methods of the invention.

FIG. 3 illustrates an embodiment of the invention where a positioning streamer 6' is positioned above a seismic streamer 6, it being understood that more than one of each may be employed. A towing vessel 2 tows both streamers 6 and 6'. positioning streamer 6' is shorter than seismic streamer 6 in this embodiment, with positioning streamer 6' having a tail buoy 17' floating on the sea surface 5 including a GPS or other global positioning receiver. Seismic streamer 6 also has a tail buoy 17 with Satellite receiver. Front end buoys are not depicted. Acoustic transmitters are indicated as squares while receivers are indicated as circles, with seismic streamer 6 having a plurality of acoustic transmitters 11 and receivers 13, and positioning streamer 6' also having a plurality of acoustic transmitters 11' and receivers 13'. It will be understood by those of ordinary skill in the art that at least the seismic streamers will also include hydrophones capable of receiving reflected signals returning from geologic features. positioning streamers may also include hydrophones but they may be turned off. As may be seen in FIG. 3, positioning streamer 6' provides many alternative acoustic paths, and with the help of another Satellite receiver 17', better positioning of seismic streamer 6 may be obtained.

Figure 4:
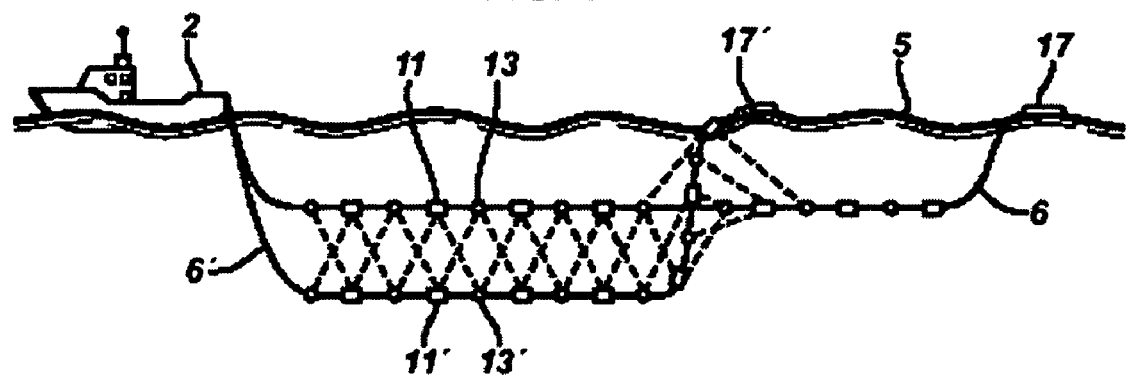

FIG. 4 illustrates a positioning streamer 6' positioned below seismic streamer 6. In this embodiment, it may be seen that a major portion of positioning streamer 6' is below seismic streamer 6. There is a small portion of positioning streamer 6' that may be at the same depth as seismic streamer 6, but in this region the positioning streamer 6' will be substantially vertical. Another portion of positioning streamer 6' will also be above seismic streamer 6. As with the embodiment of FIG. 3, this embodiment may include a GPS or other global positioning receiver on buoy 17', which provides added positioning accuracy.

Figure 5:
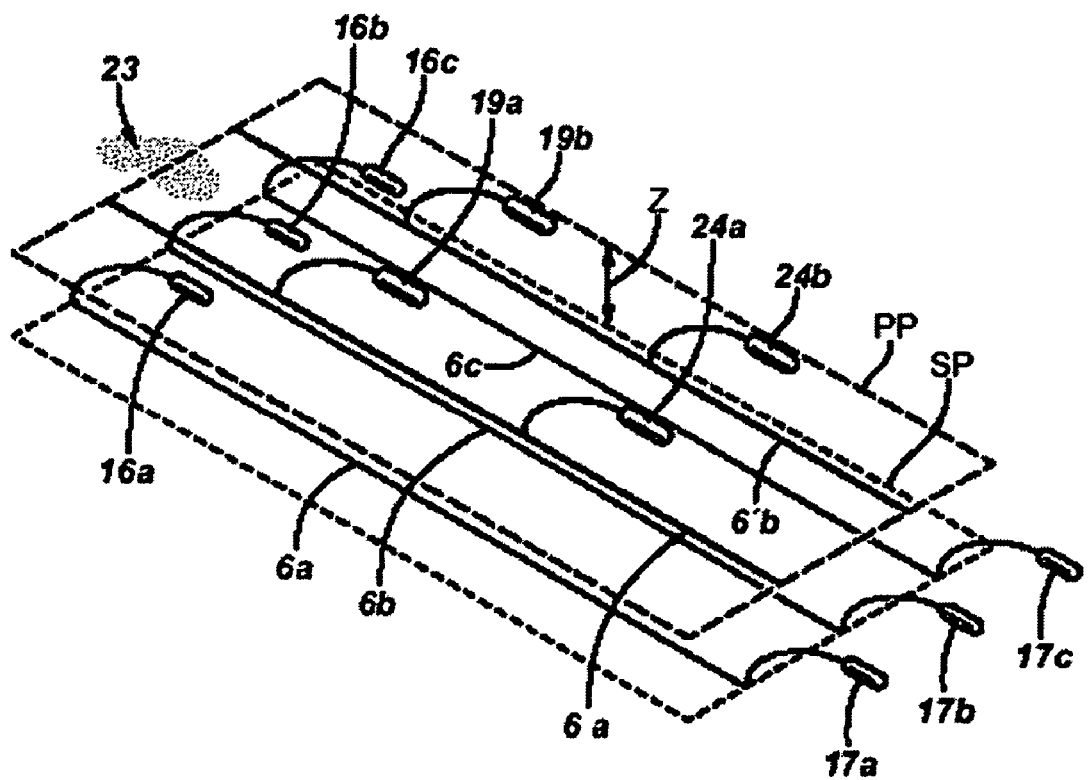
FIG. 5 illustrates a perspective view of another system and method embodiment of the invention.

FIG. 5 is a perspective schematic view of another system and method embodiment in accordance with the present invention. Three seismic streamers 6a, 6b, and 6c are illustrated, each having front end buoys 16a, 16b, and 16c, and tail end buoys 17a, 17b, and 17c. A pair of positioning streamers 6'a and 6'b are also illustrated, having essentially the same length as seismic streamers 6a, 6b, and 6c. Each positioning streamer may have a GPS buoy 19a, 19b, positioned near the front end but behind a region where bubbles (indicated at 23) formed from seismic source events may be problematic for acoustic ranging and positioning using GPS buoy 16b. Additional buoys 24a and 24b may be attached to positioning streamers 6'a and 6'b, respectively, and deployed near the midpoint of the positioning streamers, which may include additional Satellite receivers. The benefit of these additional Satellite receivers on buoys 24a and 24b will become apparent in the discussion of FIGS. 6 and 7. positioning streamers 6'a and 6'b may lie in a plane above or below seismic streamer plain. In FIG. 5, positioning streamer plane, indicated by the dashed box denoted pp, lies above seismic streamer plane Sp by a distance of Z, as indicated by the double headed arrow "Z". This distance may range from 5 to 25 meters. The acoustic connection from the floats behind the bubble cloud may provide an improved acoustic connection to the seismic spread and the mid streamer acoustic floats may provide reduced error growth towards the mid-part of the streamer.

Figure 6:
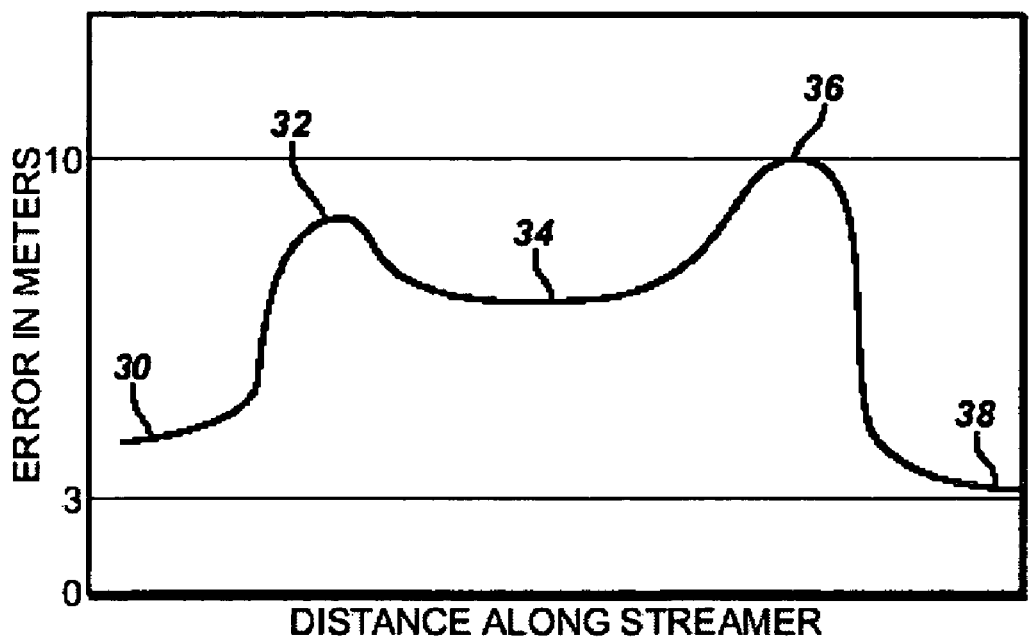
FIGS. 6 and 7 compare positioning error growth measured along the streamer length from a prior art system and method (FIG. 6) with results a system and method of the invention in accordance with FIG. 5.

FIG. 6 illustrates graphically the shape of error propagation (measured in meters) along a streamer that is a member of a prior art rectangular spread, having length much greater than width. The satellite-based control points at the front, 30, keep the errors low there, but the starting position uncertainty grows as positions are estimated away from the satellite-based control points up to a maxima at a quarter point 32 (about mid-way between the front of the spread and the longitudinal midpoint of the streamers) until the mid streamer acoustic network reduces the error again as seen at reference point 34, although not to the level found at the satellite-based control points such as at point 30 at the front of the spread. Error grows again up to a second maxima at a quarter point 36, the three-quarter longitudinal point along the streamer. A subtle difference between the front and tail can occur if, as is often the case, more satellite-based receiver floats are deployed at the tail of the spread than the front. In this case the control or starting error can be slightly larger in the front of the spread (30) compared to the tail, 38.

Figure 7:
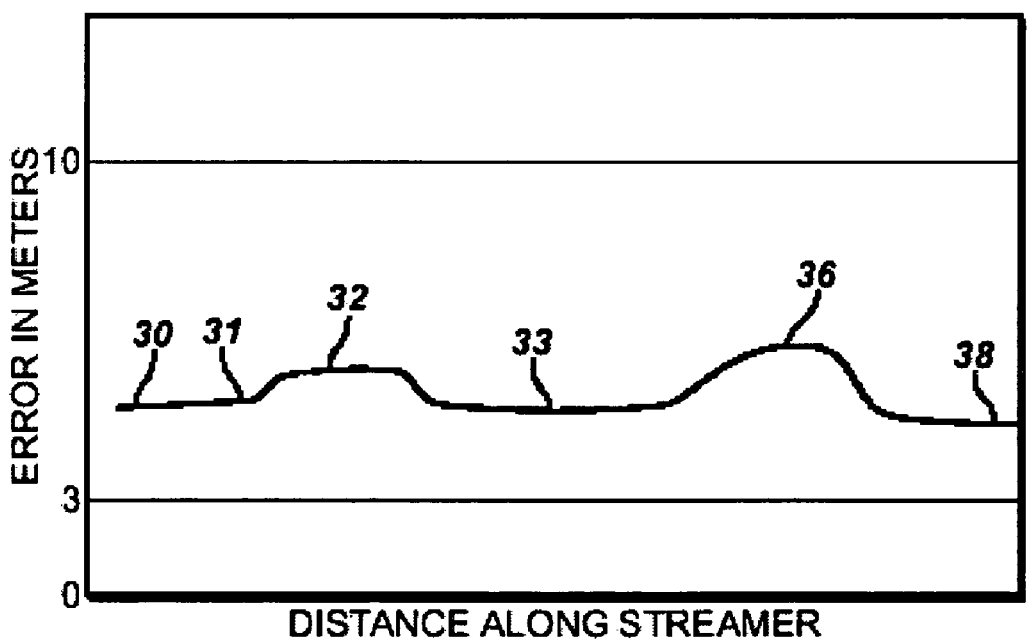

FIG. 7 illustrates graphically an example of reduced error growth that may result using positioning streamers such as illustrated in FIG. 5. Comparing the curves of FIGS. 6 and 7, note the reduced error at quarter points 32 and 36. The error at point 33, which uses both the existing mid-streamer acoustic network between seismic streamers, as well as the satellite-based buoy attached to the positioning streamer, reduces error at the mid-streamer location as well.

Horizontal and vertical control of both seismic and positioning streamers may be provided by orientation members, which may be of any type, such as small hydrofoils or steerable birds that can provide forces in the vertical and/or horizontal planes. Orientation members may be equally spaced along the length of the streamers, and may be clamped to streamers, hung from streamers, or inserted inline in streamers to provide the desired vertical and horizontal position control. One type of orientation member useful in the invention is described in commonly assigned U.S. Pat. No. 6,671,223, describing a steerable bird known under the trade designation "Q-FIN" that is designed to be electrically and mechanically connected in series with a streamer, and may comprise an elongate streamlined body adapted to be mechanically and electrically connected in series in a multi-section marine seismic streamer, and two opposed control surfaces, or wings, which project outwardly from the body and which are independently rotatable about a common axis extending substantially perpendicularly through the longitudinal axis of the body. Other steerable birds useful in the invention include battery-powered steerable birds suspended beneath the lower streamer of a streamer pair and including a pair of laterally projecting wings, the combination of streamers, orientation members (steerable birds) being arranged to be neutrally buoyant. Clamp-on steerable birds, as discussed previously, may also be employed. Steerable birds useful in the invention, including suspended birds, in-line birds, and clamp-on birds may include on-board controllers and/or communications devices, which may be microprocessor-based, to receive control signals representative of desired depth, actual depth, desired lateral position, actual lateral position and roll angle of the steerable bird. The bird on-board controllers may communicate with local controllers mounted on or in other birds, and/or communicate with other local controllers and/or remote controllers, such as a supervisory controller.

In use the position of streamers may be actively controlled by GPS or other position detector sensing the position of the streamers, and acoustic sensors, or other means may sense the orientation of one or more individual streamers and feed this data to navigation and control systems. Alternatively, data may be fed-forward to local controllers on one, some, or all orientation members. Gross positioning and local movement of streamers may be controlled on board a tow vessel, on some other vessel, locally, or indeed a remote location. By using a communication system, either hardwire or wireless, information from the remote controller may be sent to one or more local controllers on orientation members, and, when present and when desired, one or more deflecting members or streamer deflectors. The local controllers in turn are operatively connected to adjustment mechanisms comprising motors or other motive power means, and actuators and couplers connected to the orientation members, and, if present, deflectors, which function to move the streamers as desired. Feedback control may be achieved using local sensors positioned as appropriate depending on the specific embodiment used, which may inform the local and remote controllers of the position of one or more orientation members, distance between streamers, a position of an actuator, the status of a motor or hydraulic cylinder, the status of a bird, and the like. A computer or human operator can thus access information and control the entire positioning effort, and thus obtain much better control over the seismic data acquisition process.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

What is claimed is:

1. A method comprising:
   towing a first seismic streamer comprising a first ranging network comprising first receivers and first transmitters, the first receivers being adapted to receive first ranging signals propagating along first ranging paths directly from the transmitters, and the received first ranging signals being indicative of positions along the first seismic streamer;
   towing a second seismic streamer comprising a second ranging network comprising second receivers and second transmitters; and
   using the second ranging network to establish alternative ranging paths to receive the first ranging signals and generate second ranging signals that are received by at least some of the first receivers to indicate the positions along the first streamer.

2. The method of claim 1, wherein the using comprises:
   compensating for bubbles introduced by source bubbles that interfere with the reception of at least one of the first ranging signals.

3. The method of claim 1, wherein the act of towing the first seismic streamer comprises towing the first seismic streamer at a different depth than the second seismic streamer.

4. The method of claim 1, further comprising:
   selectively rejecting the first ranging signals from being used in the determination of the positions based on signal qualities of the first ranging signals.

5. The method of claim 4, wherein the act of towing the first seismic streamer comprises towing seismic sensors.

6. The method of claim 1, wherein the act of towing the second seismic streamer comprises towing global positioning satellite receivers.

* * * * *